US011952769B2

United States Patent
Hillenburg et al.

(10) Patent No.: US 11,952,769 B2
(45) Date of Patent: Apr. 9, 2024

(54) MODULAR PROCESS PLANT STRUCTURAL SYSTEM

(71) Applicant: Modular Plant Solutions LLC, Friendswood, TX (US)

(72) Inventors: Russell Richard Hillenburg, Friendswood, TX (US); David Wayne Townsend, Friendswood, TX (US); Joel Durham Hendricks, League City, TX (US)

(73) Assignee: Modular Plant Solutions LLC, Friendswood, TX (US)

( * ) Notice: Subject to any disclaimer, the term of this patent is extended or adjusted under 35 U.S.C. 154(b) by 681 days.

(21) Appl. No.: 17/052,060

(22) PCT Filed: Feb. 25, 2019

(86) PCT No.: PCT/US2019/019393
§ 371 (c)(1),
(2) Date: Oct. 30, 2020

(87) PCT Pub. No.: WO2019/168781
PCT Pub. Date: Sep. 6, 2019

(65) Prior Publication Data
US 2021/0372116 A1 Dec. 2, 2021

Related U.S. Application Data

(60) Provisional application No. 62/637,657, filed on Mar. 2, 2018.

(51) Int. Cl.
*E04B 1/34* (2006.01)
*C10G 2/00* (2006.01)
*E04B 1/348* (2006.01)

(52) U.S. Cl.
CPC ............ *E04B 1/34861* (2013.01); *C10G 2/30* (2013.01); *C10G 2300/4068* (2013.01); *C10G 2400/02* (2013.01)

(58) Field of Classification Search
CPC ................. E04B 1/34861; F25J 3/0489; B01J 2219/00002; C10G 2/30; C10G 2400/02; C01G 2300/4068
(Continued)

(56) References Cited

U.S. PATENT DOCUMENTS 3,278,452 A * 10/1966 Vorum ...................... C01B 3/38
423/652
33,788,964 4/1968 Erickson
(Continued)

FOREIGN PATENT DOCUMENTS

CA 2926483 10/2017
CH 704502 8/2012
(Continued)

*Primary Examiner* — Mark R Wendell
(74) *Attorney, Agent, or Firm* — M. Susan Spiering; Ochoa & Associates, PC

(57) ABSTRACT

Disclosed herein is a modular process plant structural system which includes numerous modules, all ISO-certified under ISO 1496 and capable of holding within the entire module at least one chemical (or non-chemical) production plant piece of equipment, capable of individually being shipped or transported. The modules can be stacked vertically, horizontally, or mixed (both vertical and horizontal arrangement). The modules are pre-fabricated offsite, built with the desired equipment within the module, pre-plumbed with piping, instrumentation, and electrical wiring, and then the multiple modules are shipped multimodally as ISO 1496 containers to the desired location and assembled to form a plant. Generally, two or more modules are connected together to form a complete plant. The plant can be of any type, e.g., chemical, mechanical/production, thermal, and
(Continued)

the like, or of any size, e.g., production, small, micro, or pilot plant scale. When no longer needed, the plant may be disassembled and reused at another site or facility.

15 Claims, 10 Drawing Sheets

(58) Field of Classification Search
USPC .......................................................... 52/36.1
See application file for complete search history.

(56) References Cited

U.S. PATENT DOCUMENTS

| | | | |
|---|---|---|---|
| 5,735,639 | A | 4/1998 | Payne |
| 8,293,805 | B2 | 10/2012 | Khan |
| 9,322,190 | B2 | 4/2016 | Driess |
| 2005/0222278 | A1 | 10/2005 | Agee |
| 2008/0283411 | A1* | 11/2008 | Eastman ............... C10G 2/30 205/343 |
| 2009/0020456 | A1* | 1/2009 | Tsangaris ............. C10K 1/101 422/105 |
| 2009/0260824 | A1* | 10/2009 | Burns ................... E21B 36/04 166/57 |
| 2010/0000153 | A1 | 1/2010 | Kurkjian |
| 2010/0025407 | A1 | 2/2010 | Benson |
| 2010/0218469 | A1 | 9/2010 | Radaelli |
| 2010/0280135 | A1* | 11/2010 | Doty ..................... C01B 3/36 518/703 |
| 2011/0146164 | A1 | 6/2011 | Haney |
| 2014/0137486 | A1 | 5/2014 | Driess |
| 2015/0190732 | A1 | 7/2015 | Vaarno et al. |
| 2016/0160515 | A1 | 6/2016 | Wallance |
| 2017/0204335 | A1* | 7/2017 | Ravikumar ........... C01B 3/56 |

FOREIGN PATENT DOCUMENTS

| | | |
|---|---|---|
| CN | 101120147 A | 2/2008 |
| DE | 3229902 | 2/1984 |
| DE | 102013111897 | 5/2015 |
| EP | 2028173 B1 | 6/2011 |
| JP | S4838030 | 11/1973 |
| JP | 2005536413 | 12/2005 |
| JP | 2011503393 | 1/2011 |
| JP | 2011163054 | 8/2011 |
| JP | 2016524524 | 8/2016 |
| WO | 2006093757 | 9/2006 |
| WO | 2012006478 A9 | 3/2012 |
| WO | 2017025847 | 2/2017 |

\* cited by examiner

MODULAR PROCESS PLANT STRUCTURAL SYSTEM

CLAIM FOR PRIORITY

This is a Continuation Application based on United States Non Provisional application Ser. number 17/052,060, filed on Oct. 30, 2020, now United States Patent number, which in turn is based on International Application Serial Number PCT/US2019/019393, filed on Feb. 25, 2019, and based on United States Provisional Application Serial No. 62/637,657 filed Mar. 2, 2018, entitled "Modular Process Plant Structural System", the priority and disclosure of which are hereby claimed in their entirety, and which are incorporated herein by reference.

FIELD OF THE INVENTION

The present invention relates to a modular process plant structural system set up primarily in remote locations; in particular, the present invention relates to modular chemical process plant structural systems and the ability to transport individual plant components or equipment, within the confines of the modular unit.

BACKGROUND OF THE INVENTION

Production of chemical process plants typically requires a specific location and a considerable amount of time and capital resources to design and construct. Often, the location is chosen due to factors such as feedstock availability, water or electrical/power resources, transportation consideration such as via rail, trucks requiring roads, or waterways so as to allow shipment of product and raw materials in and out of the plant. During the building or customizing of the chemical plant, increase in production costs is often seen, as are delays in the build out of the plant. It is desirable to quickly and cost effectively build a customized chemical plant off site and transport to and assemble at the preferred location.

To achieve acceptable return on investment, production plants generally need to operate for at least 20 to 30 years at high volumetric production. Generally, the plants are built as stationary, fixed units and once constructed, the plants cannot be relocated to a new site or a new refinery or new gas production area. In the case of gas to liquid plants (GTL) to process stranded natural gas, associated natural gas, or landfill gas, a new GTL plant has to be constructed whenever there is a source of gas. The plants are typically not easily relocated when the gas supply is depleted, or a gas pipeline is built. This leads to wastage of time, material, and labor, especially if existing GTL plants cannot be relocated economically for reuse.

Overall, huge volumes (>100 Billion cubic meters per year) of associated natural gas in isolated locations with no pipeline access are being flared worldwide due to the lack of economically viable options for converting the associated gas into easily transportable liquid products. Small-scale (<300 kta) petrochemical (e.g., methanol and ammonia) and fuel (e.g., TIGAS natural gas to gasoline, DME, and FT liquids) production plants to process associated natural gas and stranded natural gas into usable liquid products typically do not have viable economics for their build-out and maintenance. The poor economics are due to a combination of factors: 1) high on-site construction costs due to the often remote locations of stranded gas, 2) high capital cost per ton of capacity (lack of economy of scale), 3) high transportation cost for equipment and construction materials shipped to the remote sites, and 4) high operating labor costs per ton of capacity (lack of economy of scale). Many innovators have tried to make small-scale plants, and in particular small-scale methanol production units having viable economics; plants which can be built and operated in remote locations to process associated gas(es) and eliminate flaring. Micro plant production (<300 ta) is generally considered to be a process that will fit within about 1-3 ISO shipping containers, and this approach has also been attempted for the building of chemical plant micro scale processes.

German patent DE102013111897 discloses a portable production unit for a GTL process. Disclosed is a GTL plant which is embedded into a container. The GTL plant includes synthesis reactors, compressors, coolers, and control units. The GTL plant receives flare gas as a feed to generate synthesis gas and synthesizes hydrocarbons from the synthesis gas. The dimensions of the container are standard ISO dimensions. Thus, the container can be shipped and transported to the on-site field.

US patent application 2010/0000153 discloses a micro-scale GTL system that extracts methanol from a production facility located near a remote natural gas source. The micro-scale GTL system utilizes Fischer-Tropsch synthesis for production of Fischer-Tropsch liquids from flared gas. The micro-scale GTL system can be fabricated in one or more modules, depending on targeted capacity. Further, disclosed is that one or more modules can be transported and operated at the remote natural gas source.

U.S. Pat. No. 9,322,190 discloses a modular production plant having modular units for production of animal feed premix. Disclosed are horizontal modules stacked to form vertical shaped units. The horizontal modular units are stacked one above the other to form a vertical structure of the production plant. Each modular unit encloses a specific portion of the production plant and performs an individual sequence of the production process. The modular units are built at standard sizes. The modules of US '190 are not designed for vertical orientation and could not handle the load in a vertical arrangement. This is known in the art since current state of the art ISO-certified containers are not able to be turned into a vertical orientation and maintain their load bearing abilities. US '190 discloses shipping of the containers and equipment separately, and then combined and assembled appropriately at their desired location. In this manner, the components and modules can be shipped within a standard 20-foot shipping container (col 6, line 3).

Kyle Finley of Hydro-Chem, Canton, GA, presented an unpublished paper at the 15 AICHE 2015 meeting held in Austin, TX of a Hydroprime Modular Plant providing hydrogen via a modular plant design. The designs presented did not meet ISO 1496 container standard dimensions.

The major disadvantage of micro-scale and small-scale production plants is the volumetric output of the production. The volumetric output of the micro-scale production plants is limited by number and capacity of the components that can be placed within the containers. When a production plant is designed to be placed in a standard container for transportation and operation, the volumetric capacity of the components reduces due to their miniature size. This reduces the volumetric output of the production plant and negatively affects the production plant's economics. Thus, by their design, the micro-scale production plants cannot produce high volumetric output and typically have poor economics.

Process modules of the modular production plants known in the art are designed to stack in only horizontal orientation. In order to transport a component whose height exceeds height of a standard container, a maximum of 8 feet, or 9.5 feet for a high cube container, the component has to be divided into multiple modular sections. Further, each section is transported as a module and assembled at the on-site location in horizontal orientation. The height of each section of the component is limited by the height of the container. Therefore, a large number of modules are required for transporting the sections of a tall component, such as a reactor or distillation tower, thereby increasing the material and labor costs for transportation and installation of the sections of the modular production unit.

In light of the foregoing, there exists a need for a modular production plant, chemical or otherwise, that can be transported, assembled, and disassembled in an efficient manner. Further, there is a requirement for a modular structural system that not only should transport all production components for a process plant, but also should meet the ISO 1496 container specifications to allow the process plant modules to be transported internationally by road, rail and sea, including interchange between these forms of transport. Since the shipping industry is designed for horizontal container shipping and not for vertical container shipping, vertically stacking modules meeting the ISO 1496 container standards, and load bearing standards, are presently unknown to the industry.

SUMMARY OF THE INVENTION

Disclosed herein is a modular process plant structural system which includes numerous modules, all ISO 1496 certified to allow multi-modal transport, and capable of holding within the entire module at least one component of a chemical process unit (also referred to as at least one piece of equipment). While the invention is described relative to a chemical production facility, it is to be understood that this inventive system can be used for chemical or non-chemical (e.g., physical mixing or blending) production processes, and chemical production is used herein for convenience. Disclosed are two types of structural frames, with the primary structural members being 200 mm and 300 mm I-beams. Generally, the vertically oriented modules are designed to accommodate greater wind loading and have thicker I-beams. The modules are connected at their corners fittings via twistlock connectors, or the like, systems which are typically used to attach ISO shipping containers together and to shipping equipment. Different dimensions of I-beams can be used. The use of twistlock connectors allow for locking modules together in various optional orientations, e.g., top to bottom, side to side, end to end, or secured to a ship with lashing rods (no twistlock). The twistlock connectors are also used for initial, fast assembly of multiple modules into a process plant structure. The module frames are also designed with bolting plates, which can be used in addition to the twistlock connectors to secure the module frames together into a strong, secure process plant structure.

The present module frames are generally 45 feet long, but they can also be 20 feet long, or 40 feet long. The width and height of the module frames can be 8 foot wide by 8 feet tall or 8 foot wide by 9.5 feet tall to meet the ISO 1496 standard. It has been found that the ISO 1496 high cube dimensions of 8 foot wide by 9.5 foot high by 45 feet long allows for maximum process equipment within the confines of the module. Unlike that described in US '190, the present modules are generic as to accommodating equipment (i.e., any equipment can be placed inside), and have the same structure so as to allow any component unit to fit inside the ISO 1496-certified module.

When connecting the modules to build a plant, one can consider a modular production plant that includes a series of first and second (or more) modules. For a chemical plant, it is not unusual to utilize about 50-100 or more of the inventive modules. The first module includes one or more component, which can include vessels, heat exchangers, piping, etc. affixed within the first module framework. The second module includes additional component(s) affixed to the second module framework. The first module and the second module are transported in horizontal orientations. When the first and second modules are assembled, they are operatively connected via their respective corners. Further, when they are assembled, the first and second modules can be horizontally oriented or vertically oriented. The inventive modules can be stacked vertically, horizontally, or mixed as needed by the user for the specific process plant design. Hence, disclosed is a modular stacking system for a process plant structural design wherein the modules can be stacked vertically or horizontally and handle the load capacity of a given piece of equipment or subsequently stacked modules. Building modules able to orient in both directions allows flexibility in building plants. Plants can be built for full production processes or micro small, or pilot plant scale. Vertically oriented modules allow for placement of process equipment that is vertically oriented, which is more useful for chemical plants with tall reactors or distillation towers. Horizontally stacked modules are generally useful for equipment such as heat exchangers, horizontal vessels, air cooled heat exchangers, or pumps. For tall vertical equipment like distillation towers, stacking vertical modules together allows for use of fewer modules than stacking horizontal modules. Stacking vertical modules for tall equipment also reduces the number of flanged equipment connections between the modules. In other words, fewer vertical modules are required for tall equipment than horizontal modules for the same equipment. One cannot take a standard (prior art), for example, 45' horizontal module and turn it on its side and use for the same purpose. Even though these inventive module frames are designed to meet the ISO 1496 standard, the ISO 1496 standard is not strong enough to allow for vertical orientation and stacking of the modules. These subject inventive frames go beyond the ISO 1496 standard in that they are designed with the strength of structural members to allow for both vertical orientation and stacking of modules vertically.

The frames can be pre-assembled with process equipment such as vessels, heat exchangers, pumps, piping, and valves to form process unit modules, with the desired process equipment, electrical wiring, and instrumentation inside the modules. These process unit modules assembled in the ISO 1496 compatible frames can be shipped by truck, rail, or container ship, just like a standard ISO container can be shipped to any location in the world at low cost. The process equipment is all securely attached to the module frame and is all contained within the module frame; none of the equipment extends outside the ISO 1496 compatible frame. If desired, the module frames can be shrink-wrapped to protect the equipment inside the frames from the weather. When the multiple plant modules arrive at the site for the plant to be constructed, they can be lifted into position using a reach stacker designed for ISO containers or by a crane with a lifting spreader bar designed for ISO containers and the initial assembly can be done quickly using twistlock connectors. After the initial assembly, the module frames can also be connected using the bolting plates that are integral to the frames. At a later date, the plant can be efficiently disassembled and relocated due to its modular design and ease of shipping of the ISO 1496 compatible module frames. In addition, all modular units can be shop fabricated and pre-assembled at an off-site, shop location to minimize field construction risk (weather and construction labor availability) and delays.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present invention are illustrated by way of example, and not limited by the appended figures, in which like references indicate similar elements, and in which.

Figure 1A:
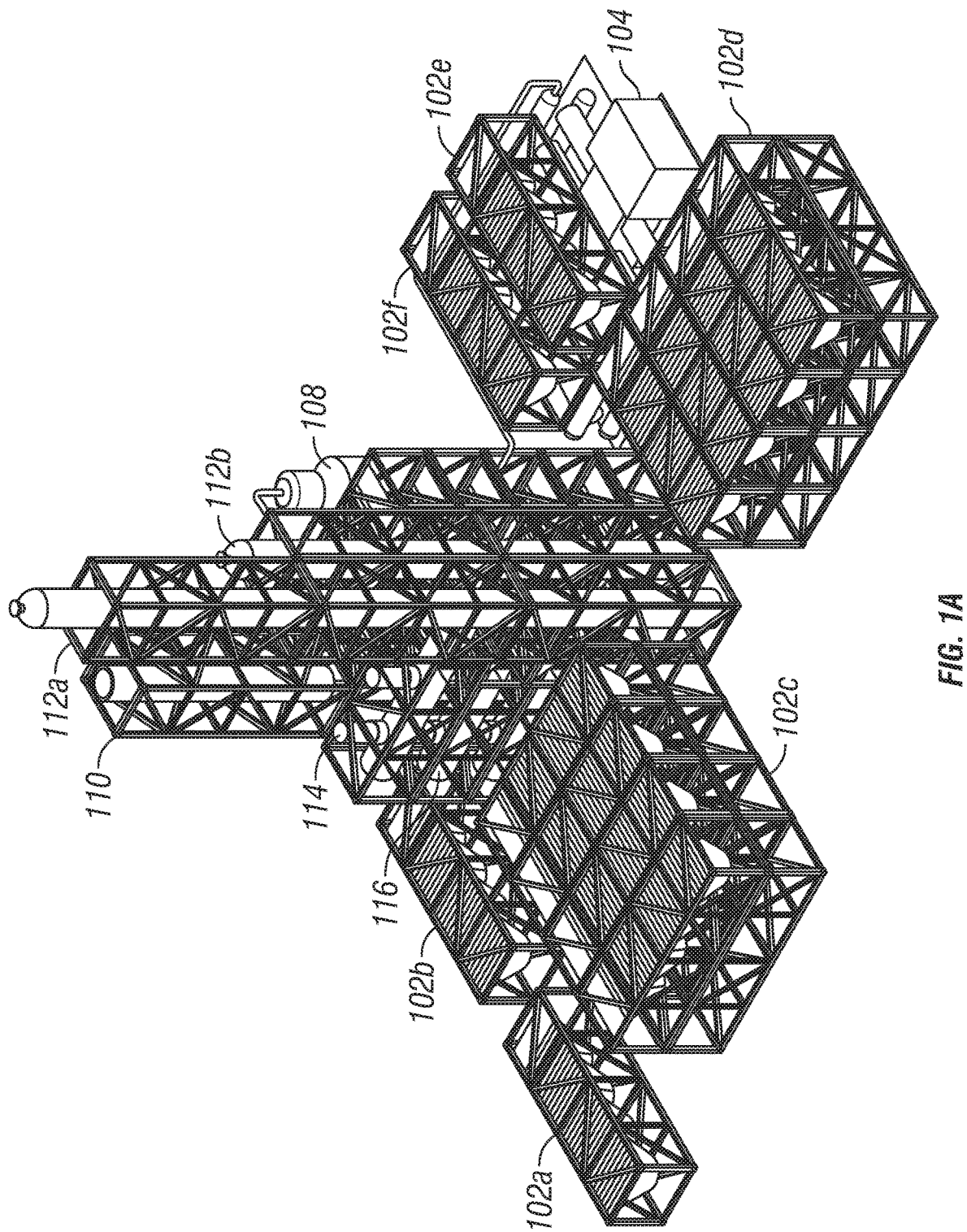
FIGS. 1A and 1B are isometric views of two different potential layouts of a modular methanol production plant using the modular structural system.

Further areas of applicability of the present invention will become apparent from the detailed description provided hereinafter. It should be understood that the detailed description of exemplary embodiments is intended for illustration purposes only and is, therefore, not intended to necessarily limit the scope of the present invention.

DETAILED DESCRIPTION OF EMBODIMENTS

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention.

There may be additional components described in the foregoing application that are not depicted on one of the described drawings. In the event, such a component is described, but not depicted in a drawing, the absence of such a drawing should not be considered as an omission of such design from the specification.

Before describing the present invention in detail, it should be observed that the present invention utilizes a combination of ISO 1496 compatible structural frame components which when two or more are combined, constitute a modular process plant structural system. Accordingly, the components and the method steps have been represented, showing only specific details that are pertinent for an understanding of the present invention so as not to obscure the disclosure with details that will be readily apparent to those with ordinary skill in the art having the benefit of the description herein.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The inventive modular process plant structural system comprises multiple modules, at least two, wherein each module includes its individual framework. The framework includes one or more longitudinal frame members which are rigidly connected by transverse frame members and vertical frame members. This arrangement of horizontal, vertical, and transverse frame members create the framework for the individual module that can supports at least one piece of equipment or component of the production process, piping, and/or electrical control equipment. The frames can also be used as supporting structure only for other frames and do not necessarily have to contain process equipment. Generally, the piping and wires are pre-plumbed and pre-wired within each module. The components are adapted within the module to receive a set of inputs and perform a preset process which results in production of the desired product. Each module can be shipped in the horizontal orientation and can be installed in either the horizontal or vertical orientations. Further, a first module having a first framework can be stacked horizontally or vertically with a second module having a second framework. In a horizontal stacking configuration, the first and second frameworks are connected together in a horizontal plane, typically on the 8 foot by 45 foot (or 40 foot or 20 foot) sides of the two frames.

In a vertical stacking configuration, the first and second frameworks are also connected together in a horizontal plane, but on the 8 foot by 9.5 foot (or 8 foot by 8 foot) sides of the frames. Further, the first and second modules can be horizontally or vertically stacked and also placed in a horizontal or a vertical orientation. The modules may also be stacked in a mixed orientation of both vertical and horizontal. In one embodiment, the first module in vertical orientation is vertically stacked on to the second module in vertical orientation. In another embodiment, the first module in vertical orientation is horizontally stacked on to the second module in vertical orientation. The number of modules which can be stacked together is limitless and based on the desired use. It is not inconceivable that a full production process plant will need between 50-100, or more, modules stacked in both vertical and horizontal orientations.

With the exception of module frames that are used as support structure only, each module includes one or more components affixed to a framework. The component is of a production unit. Component herein is defined as a piece of equipment for the production plant. For example, the component may be a chemical reactor, a distillation tower, or a dehydrator for use in the production plant. One or more plant components may be assembled inside the module frame and the module can be shipped to the plant site for construction of the plant. It may be that the equipment or component needs to be housed within several modules due to its size (e.g., a distillation tower may need several vertically stacked modules to fit therein). In this case, the distillation tower is built in sections with flange connections between the vertically oriented modules. For example, a 160 foot-tall distillation tower can be built in 4 flanged sections that fit within four 45 foot module frames. The tower sections are attached inside the four module frames, along with the instrumentation and piping. Each of the four modules containing flanged sections of the distillation tower is an ISO 1496 compatible shipping frame, so the tower sections can be transported horizontally by truck, rail, or containerized cargo ship just as an ISO container can. The module frame serves as the container for the transportation of the component. The component is retained inside the framework by any suitable means, such as by virtue of design of the framework, by bolting, by welding, and the like. Further, the framework provides support to the component when the module is in both horizontal and vertical orientations. In one embodiment, the first module is shipped in a horizontal orientation and installed on-site in a vertical orientation. The dimensions of the framework meet the ISO 1496 standard, and no process equipment extends beyond these dimensions, to ensure that the process plant modules will ship as a standard ISO shipping container. This allows the modules to be shipped intermodally. A foundation is built for setting up the modular process plant, typically at a location near a feedstock supply or if a pipeline supply of feedstock is used, near a customer's facility (also referred to as "on-site" installation). The foundation is built such that the foundation supports the modules that are installed in either the horizontal and/or vertical orientation.

Figure 1B:
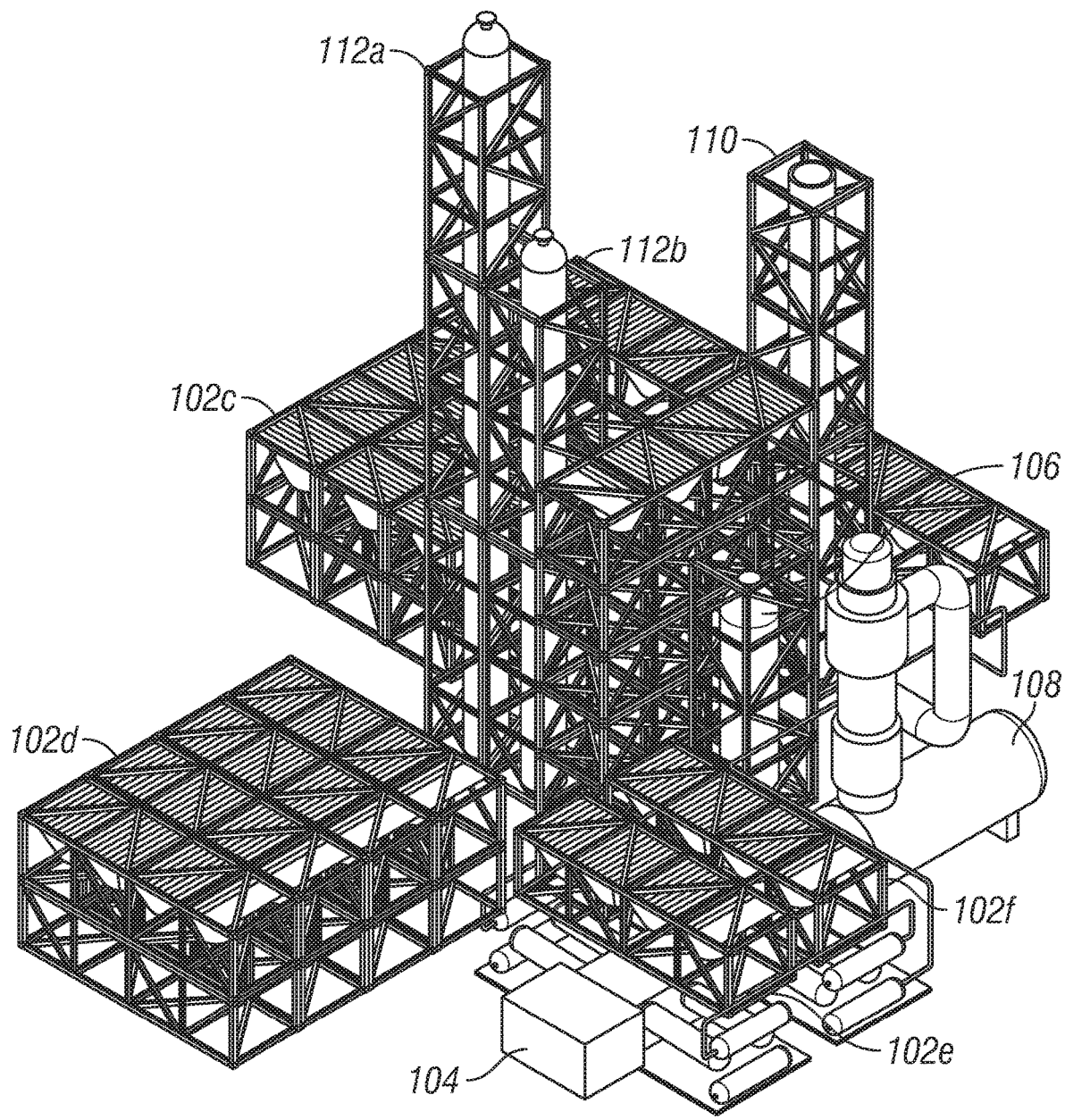

While any type of plant may be built using the inventive modules, for ease of reference herein, a methanol plant will be described as the exemplified plant. Referring to FIG. 1A and FIG. 1B, isometric views of two different configurations of a modular methanol production plant 100 (hereinafter "plant 100"), in accordance with an embodiment of the present invention are shown. The plant 100 includes pre-built modules for methanol production from associated gas (flare gas), stranded gas, pipeline natural gas, or landfill gas. One or more pre-built modules are stacked together to form a process unit. The plant 100 further includes a plurality of cooling units 102a-102f (collectively referred to as cooling units 102), a gas compression unit 104, a steam-methane convection reforming unit 106, a furnace 108, a waste heat recovery boiler and stack 110, methanol distillation column and light ends removal column 112a and 112b (collectively referred to as methanol purification units 112), a deaerator 114, and a steam drum 116. Each process unit includes one or more modules and over-sized equipment can be installed external to the modules. For example, the syngas production unit includes the furnace 108 and the steam-methane convection reforming unit 106 which are both oversized and installed external to the modules, and the waste heat recovery boiler and stack 110, which are both in modules. With the exception of frames that are used for structural support only, each module includes a component of a processing unit, affixed within a framework. In the typical embodiment, each module is pre-built with piping and wires.

Figure 6:
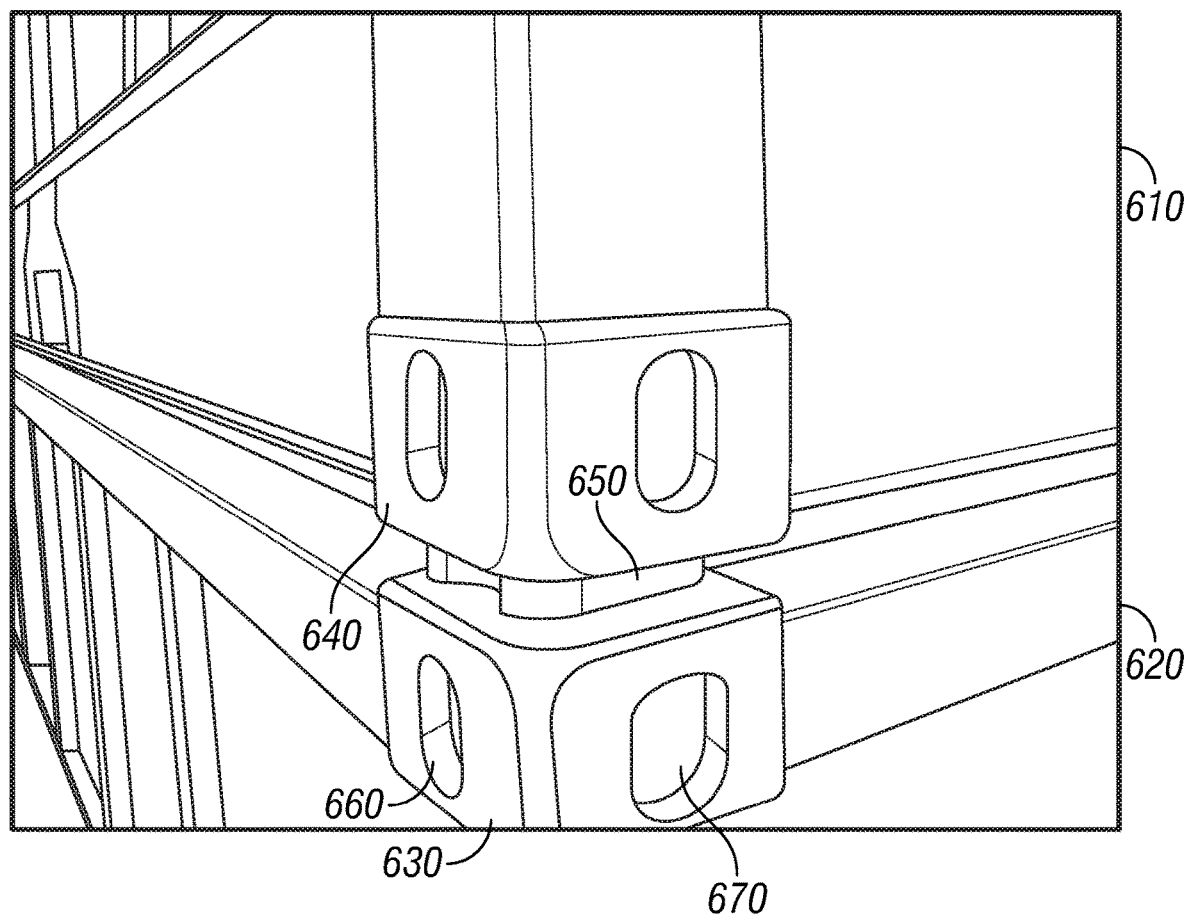
FIG. 6 illustrates two stacked modules with their corner castings connected with a twistlock connector.
Figure 8:
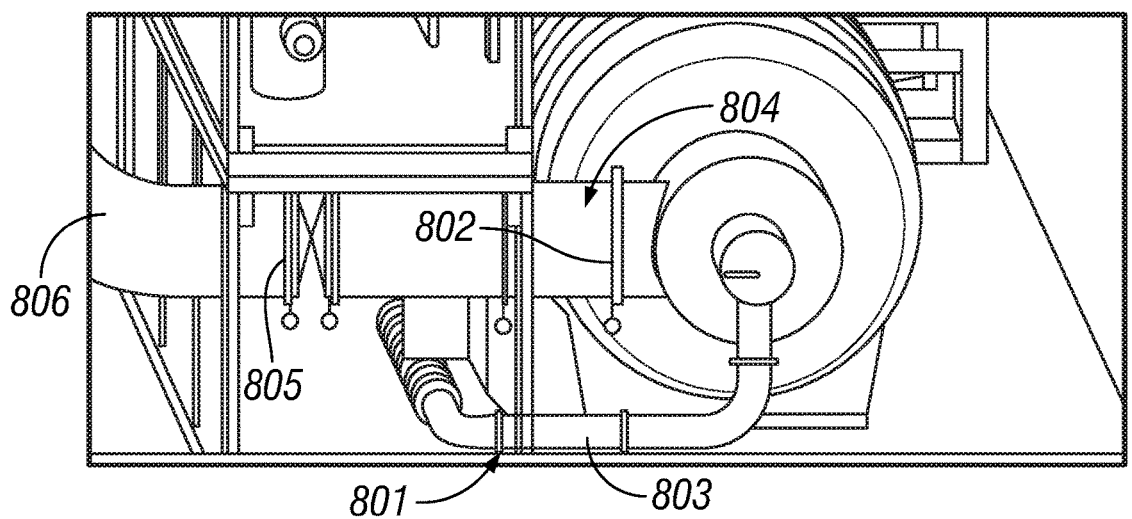
FIG. 8 illustrates flanged piping connections and piping spool pieces used to connect process equipment between multiple modules and process equipment external to the modules.

Each of the cooling units 102a-102f includes one or more cooling modules. Each of the cooling units 102c and 102d has multiple cooling modules that are horizontally stacked together to form respective cooling units. Cooling units 102c and 102d are supported by a lower level of modules containing other process equipment. The cooling modules of the cooling units 102b-102d are supported by the lower modules and the cooling modules are initially connected to the lower modules using twistlock connectors in the corner castings as shown in FIG. 6. The twistlock connectors lock the cooling modules to each other and to the supporting modules. After the initial installation with twistlock connectors, bolts and nuts are used in the bolting plates to secure all of the frames permanently. Piping is connected to the cooling units by means of connectors or flanges, as shown in FIG. 8. There are also connectors (not shown) for securing the cooling unit 102a,102b that sits at grade level to the foundation. Each cooling module includes a cooler affixed in a framework. In one embodiment, each cooling module is cuboidal in shape. In another embodiment, the cooling modules are pre-built with piping and electrical wiring. As with all of the other modules, because the frames are built to the ISO 1496 standard, the cooling modules can be shipped multimodally as any other ISO container. The module frames can be shipped to the air cooler manufacturer and the cooling modules can be pre-assembled with the coolers, piping, wiring, and instrumentation.

The framework has longitudinal frame members, vertical frame members, and transverse frame members connected to each other at corners and intersections. In the outer corners of the framework or module, both top and bottom, are found eight ISO 1161 corner fittings, sometimes called corner castings 630 and 640. These corner fittings have holes 660 and 670 of standardized dimensions, defined by the ISO 1161 standard. The corner fittings are designed to allow twistlock connectors 650 to be used to connect the module frames together, refer to FIG. 6. The ISO 1161 corner fittings also allow other methods like lashing rods and bridge fittings to be used to secure the ISO 1496 compatible frames to containerized cargo ships. In one embodiment of the module assembly, the connectors include locking bolts. In another embodiment, the connectors include twistlocks. In yet another embodiment, a combination of twistlock and bridge clamp connectors may be used and installed on-site on a foundation, thereby reducing the time required to set up the plant 100.

The flare gas or feed gas first goes to the gas compression unit 104 where the gas is compressed and then cooled in the air cooler 102f. Compression of the feed gas allows the gas to be fed to the sulfur removal and pre-reforming section for removal of sulfur-containing compounds and the breakdown of heavy hydrocarbons. The conditioned feed gas is mixed with steam and flows to the steam-methane convection reformer unit 106 where the steam and methane are reformed to produce syngas, a mixture of carbon monoxide and hydrogen. The syngas is cooled and compressed and sent to a methanol reactor unit 720, where the syngas is converted to methanol. The methanol product is condensed in cooler 102c and then sent to methanol distillation, units 112a and 112b. The light ends are first removed in the light ends distillation tower, unit 112b, and then the methanol is sent to the final purification tower, unit 112a for removal of water, ethanol, and heavier alcohols (fusel oil). The overhead methanol product from unit 112a is condensed in cooler 102d and pumped to the methanol product storage tanks.

In an embodiment, each distillation tower includes a tower consisting of four flanged sections, each in one module. The tower module frames are shipped in a horizontal orientation and are then installed in a vertical orientation. The four tower modules for both of the towers (112a and 112b) are stacked in a vertical orientation and the flanges for the tower sections are bolted together, resulting in distillation towers that are approximately 160 feet tall. The methanol reactor unit 720 is shipped horizontally and then installed in a vertical orientation.

Figure 7:
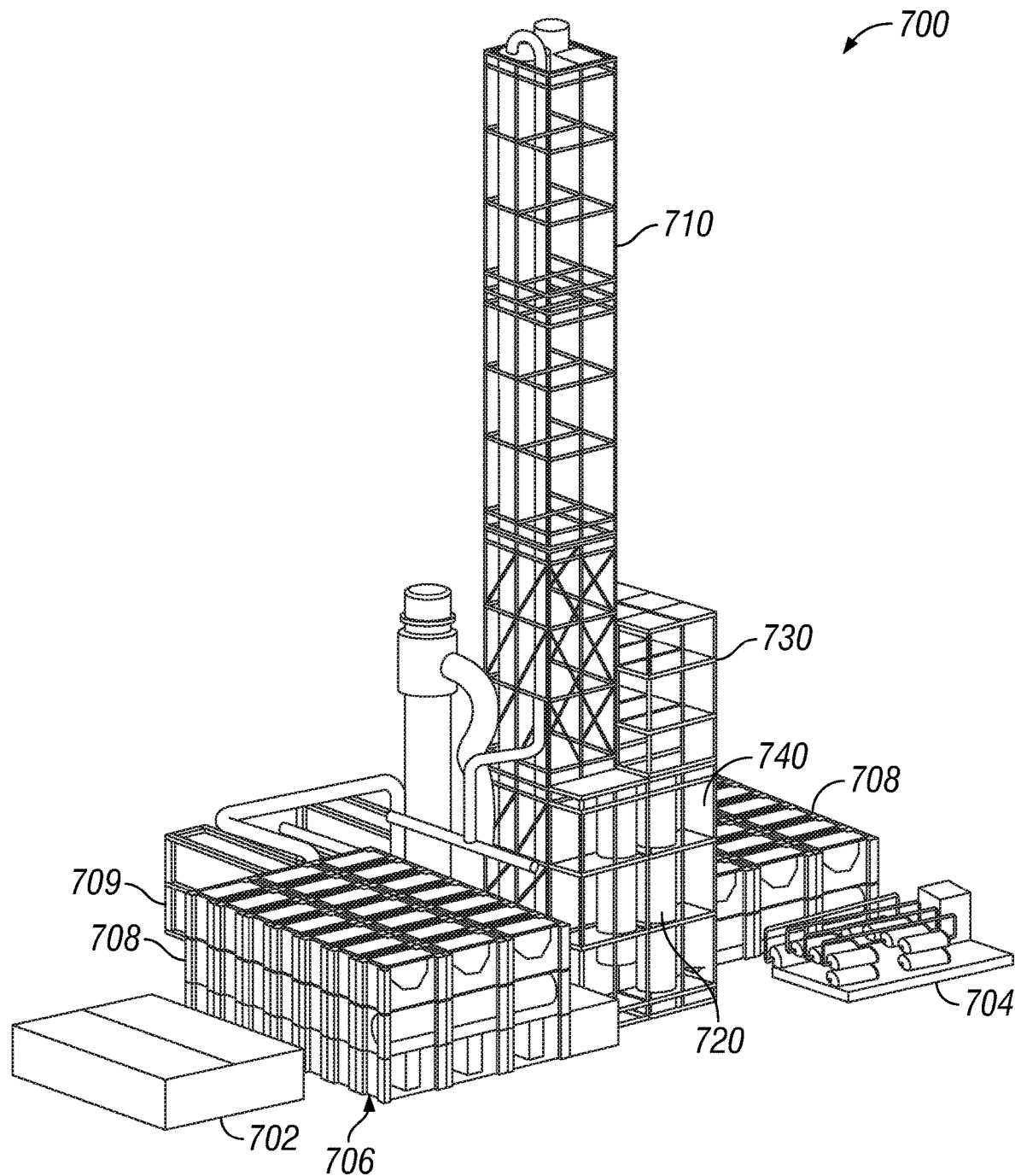
FIG. 7 illustrates a chemical plant constructed with a Modular Process Plant Structural System.

The plant 100 further includes a control room unit with control instrumentation, shown in the bottom left corner of FIG. 7 that monitors and controls various processes of the modular production plant. The plant can be operated locally in the on-site control room or it can be operated remotely by using one or more protocols known in the art. Process plants with controls that allow local or remote operation of the plant are well-known to a person skilled in the art.

Figure 2A:
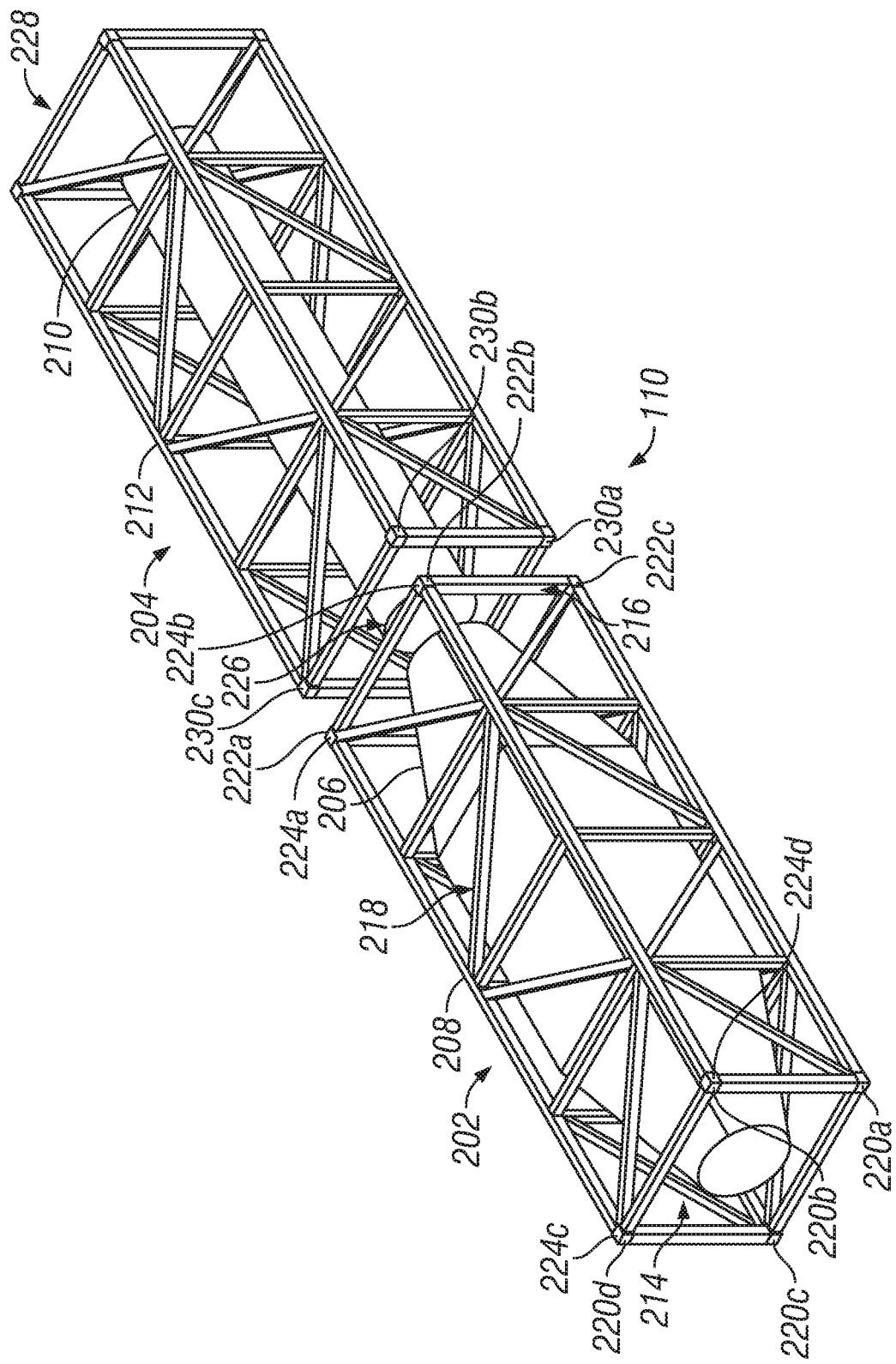
FIG. 2A is an isometric view of two module frames in the horizontal orientation.
Figure 2B:
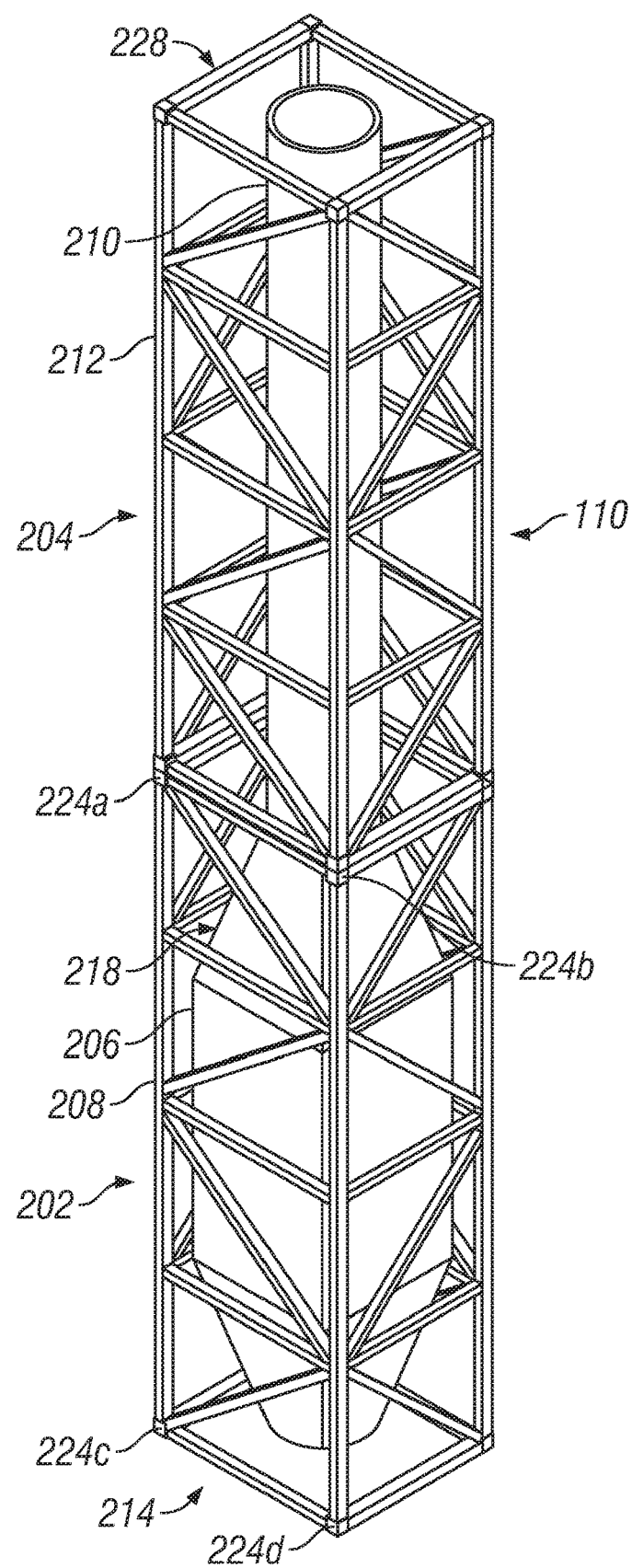
FIG. 2B is an isometric view of two stacked module frames in the vertical orientation with vertically oriented process equipment in the module frames.

In FIGS. 2A and 2B, the waste heat boiler section, unit 110 of the plant 100 is shown, in accordance with an embodiment of the present invention. The waste heat boiler section unit 110 includes two gas preheaters, a duct firing section, a waste heat boiler, a selective catalytic reduction unit, and a flue gas stack. The waste heat boiler section includes a heat exchanger section 208 installed in the lower module 202. The upper module 204 contains the flue gas stack, 210. The first waste heat boiler section, module 202 includes a first end 214, a second end 216, and a plane 218. The first end 214 of the waste heat boiler 202 has a set of four ISO 1161 corner fittings, 220a-220d with holes in each corner designed for twistlock connectors. The second end 216 of the waste heat boiler module 202 also has a set of four ISO 1161 corner fittings, 222a-222d. The first end 226 of waste heat boiler section module 204 also has a set of four ISO 1161 corner fittings, 230a-230d.

The first and second modules of the waste heat boiler section 202 and 204 are shipped or transported in the horizontal orientation, the normal orientation for the ISO 1496 standard. However, module frames 202 and 204 are designed from a structural strength standpoint such that they can be set and stacked in the vertical orientation in the plant 100. The first and second frameworks 208 and 212 are sturdy and designed to withstand the static load of the waste heat boiler process equipment as well as wind load on the modules and stack. The typical ISO 1496 container cannot be oriented in the vertical position like these module frames can.

In order to assemble the first and second waste heat boiler modules 202 and 204, the first and second waste heat boiler section modules 202 and 204 have to be in a vertical orientation. The third end 226 of the second waste heat boiler module 204 is stacked on the second end 216 of the first waste heat boiler module 202 in a vertical configuration to form the waste heat boiler unit 110. The set of corner fittings 230a-230d (see FIG. 6 for enlarged corner fitting) of the second reformer module 204 is positioned on the corresponding set of corner fittings 222a-222d, and secured with twistlocks through the holes in the corner fittings to the first waste heat boiler module 202.

In one embodiment, the first and second waste heat boiler modules 202 and 204 may be secured and locked using bridge clamps or other corner connectors which have suitable strength to secure the modules in place. In another embodiment, the first and second waste heat boiler modules 202 and 204 are fastened by way of bolts and bolting plates to secure the vertical stacking of the modules 202 and 204. Further, the first end 214 of the first waste heat boiler module 202 is connected to the foundation of the plant 100 using bolting plates and foundation bolts, connectors known in the art. The second set of corner fittings 224 are secured with twistlocks, and the modules may be connected horizontally to another module of the plant 100. The first framework 208 and the second framework 210 allow the waste heat boiler unit 110 to be transported in horizontal orientation, thereby allowing it to be transported as standard ISO 1496 containers, reducing transportation cost and allowing multimodal transportation. Further, the first and second frameworks 208 and 210 of the first and second waste heat boiler modules 202 and 204 can be turned on ends such that the first and second waste heat boiler modules 202 and 204 are vertical and locked in place by way of the connectors. Therefore, the amount of time taken to setup the waste heat boiler section unit 110 is reduced. The corner fittings are also used during shipping to secure the modules to the transportation equipment (e.g., ship, truck, rail car).

In another embodiment, the design of the module frames meets the ISO 1496 standard for a 45 foot, high cube container (45-foot-long, 8-foot-wide×9.5-foot high) allowing multimodal transportation. Therefore, the total transportation cost of the plant 100 is less than the transportation cost of a typical modular plant.

Figure 3:
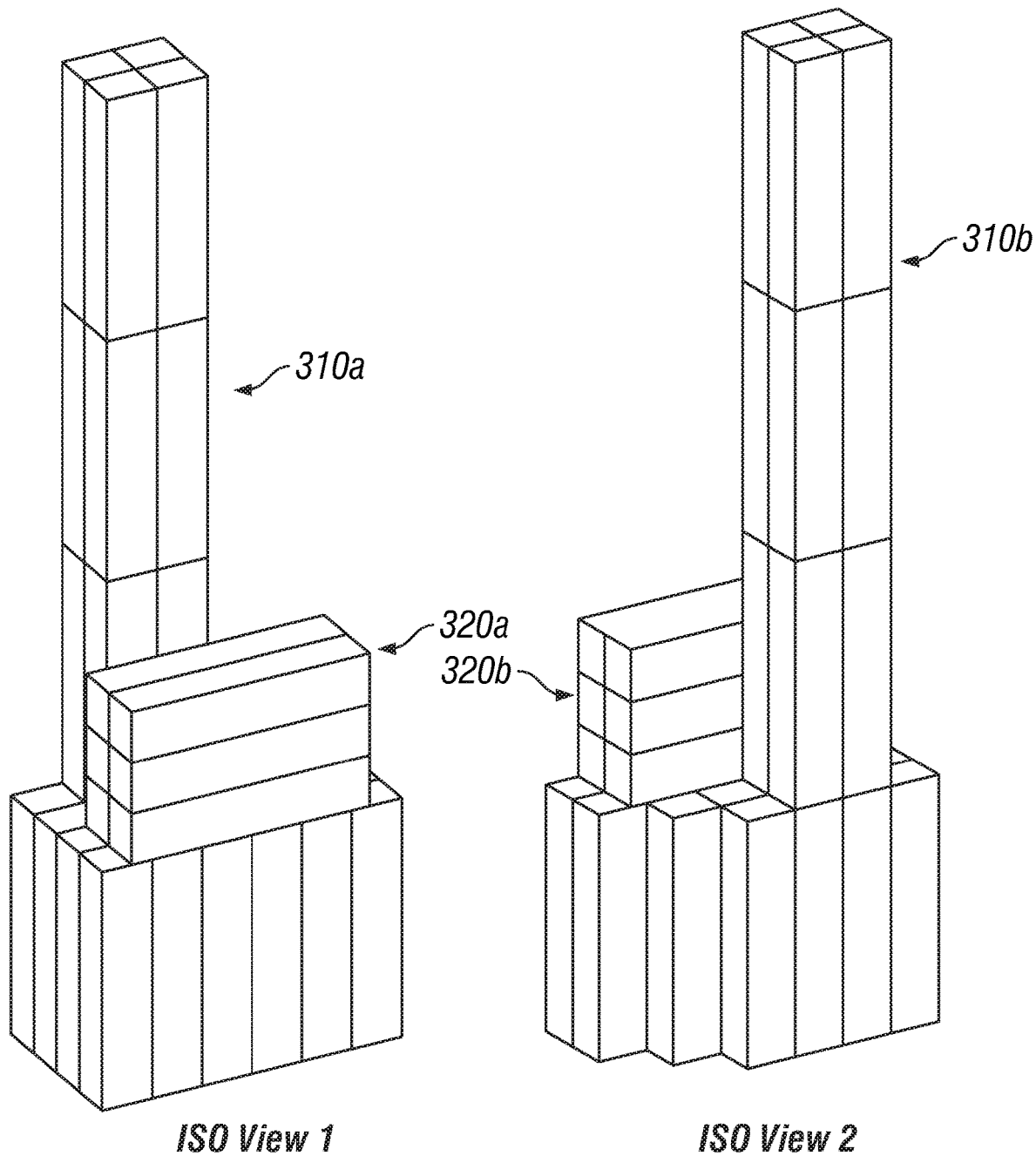
FIG. 3 illustrates two isometric views of multiple modules arranged in both the horizontal and vertical orientations, as well as stacked horizontal and stacked vertical modules.

FIG. 3 illustrates two isometric views of various horizontal 320a, 320b, and vertical, 310a, 310b, modules stacked to accommodate process equipment. The figure exemplifies alternate stacking of the horizontal and vertical modules. The two isometric views illustrate potential plant layouts using the ISO 1496 compatible frames and the Modular Process Plant Structural System with both the horizontal and vertical modules stacked to accommodate process equipment.

Figure 4:
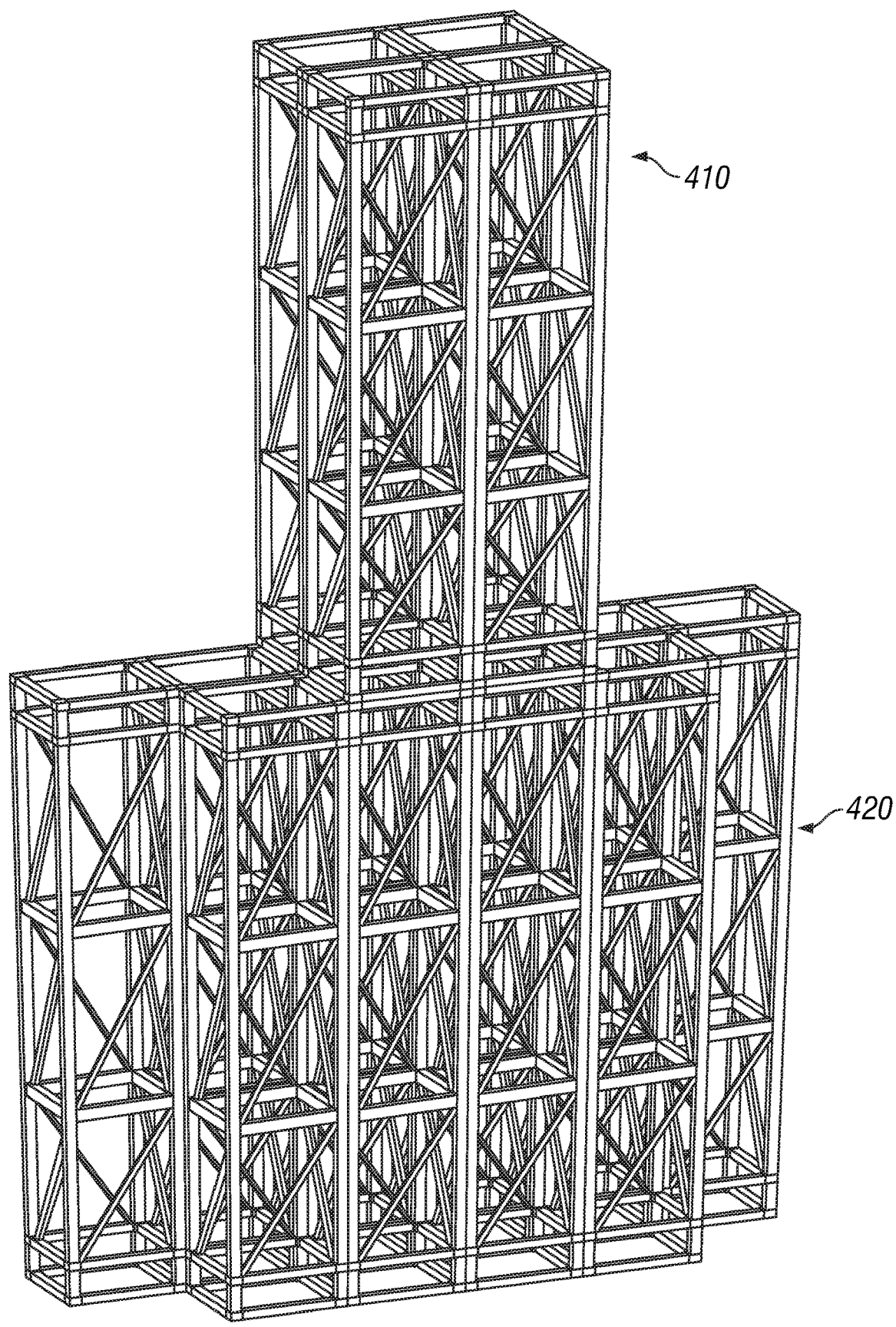
FIG. 4 is an isometric view of vertically stacked modules.

FIG. 4 is an isometric view of vertically stacked modules shown to exemplify a partial portion of the plant wherein central taller vertically stacked modules, 410, house longer, taller equipment therein. Module 420 is the shorter vertical stacked module. Module 420 are in a vertical orientation but are also connected to the adjacent stacked vertical modules 410.

Figure 5:
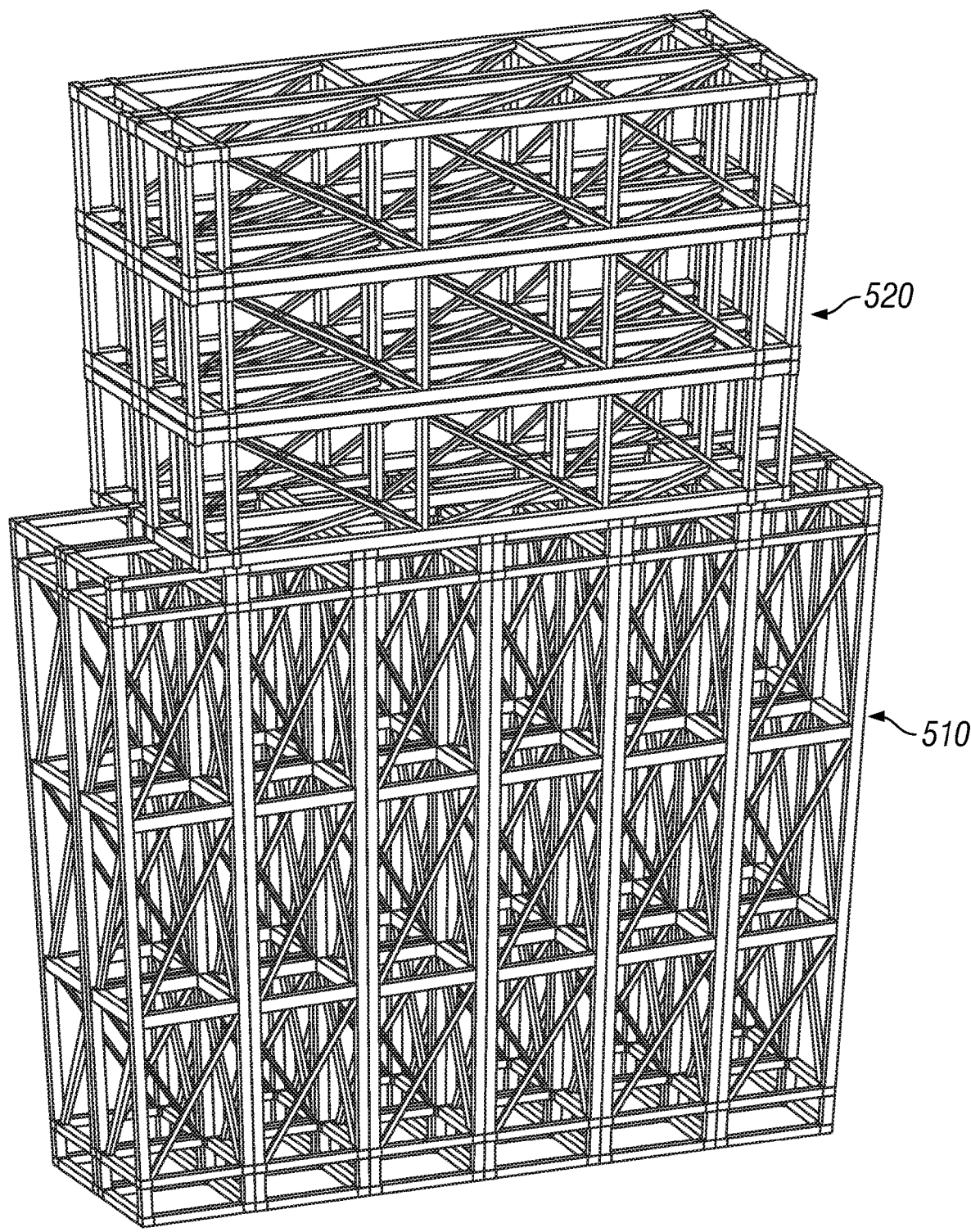
FIG. 5 is an isometric view of vertically stacked modules with horizontally stacked modules on top thereof.

FIG. 5 is an isometric view of vertically stacked modules, 510, with horizontally stacked, 520, modules on top thereof. The figure exemplifies the plant and the need to accommodate various arrangement of modules to accommodate different process equipment of the plant. Modules in vertical orientation are horizontally stacked and modules in horizontal orientation are vertically stacked. Moreover, the modules in vertical orientation are vertically stacked with the modules in horizontal orientation.

FIG. 6 illustrates two modules, 610, 620 respectively, with ISO 1161 standard corner fittings (corner castings) connected with a twistlock connector 650. Oval shaped holes 660, 670 in the corner fittings meet the ISO 1161 standard to allow for twistlock connectors, lashing rods, bridge fittings, and other methods of securing the modules for transportation and connecting the modules together when assembling them in a process plant.

FIG. 7 illustrates a chemical plant having both vertically 740, and horizontally 730, stacked modules. The chemical plant 700, is constructed using a modular process plant structural system. The illustration shows the process equipment inside modules, which are stacked in both the horizontal and vertical orientations. The process plant in this illustration utilizes both horizontally stacked modules and vertically stacked modules, as well as vertical modules 740 supporting horizontally stacked modules 730. The lower left corner shows two modules 702 which typically would house a control unit for the plant. Oversized gas compression equipment in the lower right corner 704 that will not fit in modules is skid-mounted to allow for pre-assembly and ease of transportation. Modules at the lower level of the plant 706 adjacent to the control unit usually contain a water purification unit, an air compression unit, and a nitrogen production unit. Modules at mid-level 708 of the plant adjacent to the control unit typically contain pressure vessels for compressed air and compressed nitrogen. Modules at the upper level of the plant 709 adjacent to the control unit are air-cooled heat exchanger modules. Tall modules 710 in the middle of the plant generally contains two distillation towers, a water stripper tower, a flare knock-out pot, a flare stack, and a reformer flue gas stack.

The modules are rigidly interconnected in both the vertical and horizontal positions. The design of framework for the modules differs slightly between modules intended for vertical orientation and horizontal orientation. Module frames intended for vertical orientation are constructed of 300 mm I-beams or 200 mm I-beams, whereas module frames intended for horizontal orientation are constructed of 200 mm I-beams. Some module frames intended for vertical orientation require the stronger I-beams primarily to handle the wind load of the tall structure. Both designs of horizontal frameworks and vertical frameworks meet the ISO 1496 standard, using the ISO 1161 corner fittings. While 200 mm and 300 mm I-beams are described herein, it is understood by artisans that other sizes are possible for use in the modules. American standard I-beam dimensions can be used instead of metric dimensions. Also, rectangular or square cross section tube can be employed for the frame members instead of I-beams.

FIG. 8 illustrates pipe spool pieces with flanges to connect equipment between the modules and to connect to free-standing equipment outside of the modules of the chemical plant. Flanged piping connections 801 and 802 and piping spool pieces 803 and 804 illustrated in FIG. 8 are used to connect process equipment between modules and stand-alone equipment such as the furnace. Flanged piping connection 805 and piping spool piece 806 are examples of connections between multiple modules.

Figure 9:
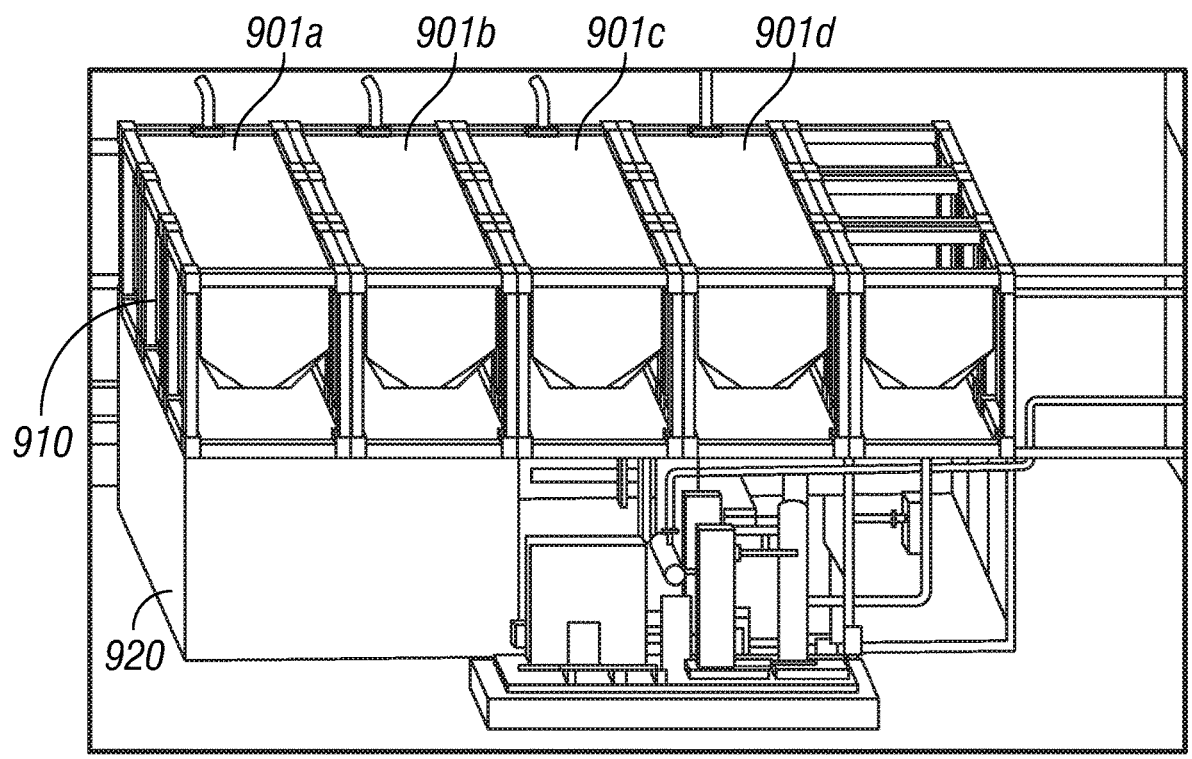
FIG. 9 illustrates air coolers for a chemical process unit in the top layer of modules within two layers of horizontally stacked modules.

FIG. 9 illustrates air coolers 901*a*-901*d* that function as the overhead condenser of the methanol distillation column of the plant. The air coolers 901*a*-901*d* are within the upper layer of two layers of horizontally stacked modules 910 and 920. The lower left module 920 contains electrical switch gear to support the plant. The plant can be efficiently disassembled and relocated due to its modular design. The modules are ISO-1496 compliant and after disassembly, the modules can be transported to a new site on a containerized cargo ship, on a standard ISO trailer frame of a truck, or by using railcars. In an embodiment, the framework is preferably made of any suitable material, including carbon steel, galvanized steel, and the like, which bears load of the process unit housed in the framework during transportation and operation. The framework allows piping, instrumentation and electrical wiring to be pre-plumbed and pre-wired to the module. Further, modules can be pre-assembled to form process units, and the individual equipment-filled modules can be shipped as standard ISO 1496 certified containers. This results in easier shipping logistics to remote locations and lower shipping cost. Further, because the module design allow for vertical orientation of the modules, the vertical plant components, whose height exceeds the height of a standard ISO container, can be divided into sections with flanged connections and the individual sections installed in multiple modules horizontally, transported to the site as a standard container (horizontally), and then at the site, the multiple modules can be stacked vertically, and the flanges connected to reassemble the tall process equipment. This design of the module framework allows for this efficient way of transporting tall process equipment to remote locations.

The modules are configured in such a way that plant 100 can be remotely operated. This eliminates the additional requirement of onsite workers to monitor and operate the plant 100. The plant 100 functions in a 'plug and play' type of installation and operation. Herein "plug and play" means the modules are pre-wired and pre-tested for both electrical power and instrumentation in the module fabrication shop. When the multiple modules are assembled into the process structure on the plant site, the electrical and instrumentation wiring from junction boxes in each module only has to be un-rolled and interconnected with junction boxes in adjacent modules. Flanged, interconnecting piping spool pieces are also pre-fabricated and numbered in the module fabrication shop. To connect the piping between modules, the pre-fabricated, numbered piping spool pieces are installed between modules and connected with the flanges. This minimizes the construction and commissioning time at the plant site.

It will be understood by a person skilled in the art that the modular production plant of the present invention is not limited to methanol production. The modular production plant can be used for any gas-to-liquids process or other production processes required at remote locations. In one embodiment, the plant 100 produces a volume of methanol equivalent to 17 tanker trucks per day. The operational cost of the plant is reduced as it can be operated remotely. The modular production plant is also considered portable from a transportation perspective.

While the discussion has focused on building of the plant in remote locations, it may be built as a fixed unit on a planned (possibly even a non-remote) site. The modular production plant can be easily built at any location desired in a simple, cost efficient manner. Modular construction can lower the overall construction cost and reduce the field construction risk. Stacking vertical modules for tall equipment also reduces the number of flanged equipment connections between the modules. In other words, fewer vertical modules are required for tall equipment than horizontal modules for the same equipment.

The frames can be pre-assembled with process equipment such as vessels, heat exchangers, pumps, piping, and valves to form process unit modules, with the desired process equipment, electrical wiring, and instrumentation inside the module. These process unit modules assembled in the ISO 1496 compatible frames can be shipped by truck, rail, or container ship, just like a standard ISO container can be shipped to any location in the world at low cost. The process equipment, as well as electrical and instrumentation, is all securely attached to the module frame and is all contained within the module frame; none of the equipment extends outside the ISO 1496 compatible frame. If desired, the module frames can be shrink-wrapped to protect the equipment inside the frames from the weather. When the multiple plant modules arrive at the site for the plant to be constructed, they can be lifted into position using a reach stacker designed for ISO containers or a crane with a lifting spreader bar designed for ISO containers and the initial assembly can be done quickly using twistlock connectors. After the initial assembly, the module frames can also be connected using the bolting plates that are integral to the frames. At a later date, the plant can be efficiently disassembled and relocated due to its modular design and ease of shipping of the ISO 1496 compatible module frames. In addition, all modular units can be shop fabricated and pre-assembled at an off-site, shop location to minimize field construction risk (weather and construction labor availability) and delays. The constructed plant may optionally be remotely operated via means known in the art.

The present invention has been described herein with reference to a particular embodiment for a particular application. Although selected embodiments have been illustrated and described in detail, it may be understood that various substitutions and alterations are possible. Those having an ordinary skill in the art and access to the present teachings may recognize additional various substitutions and alterations are also possible without departing from the spirit and scope of the present invention, and as defined by the following claims.

The invention claimed is:

1. A modular process plant structural system for building a production plant at a desired plant site, comprising at least two modules:
a first module having a first component affixed to a first framework;
a second module having a second component affixed to a second framework,
wherein the at least two modules are ISO-certified under ISO 1496 and each holding within the entire module at least a portion of one production plant piece of equipment, and capable of individually being transported to the desired plant site for assembly;
wherein further, the at least two modules are pre-equipped for electrical, piping, and control instrumentation, and the first and second modules are secured together at the desired plant site, via corner fittings in a stacking fashion in either the horizontal, vertical, or both positions relative to each other, forming a production plant which is capable of being disassembled and moved to a new desired plant site, and wherein flanged piping connections and piping spool pieces are used to connect process equipment between modules and stand-alone equipment.

2. The modular process plant structural system of claim 1, wherein, when the first and second modules are assembled, the second module is operably connected with the first module, and wherein the first and second modules are horizontally placed with respect to each other in at least one of a vertical and a horizontal stacking configuration.

3. The modular process plant structural system of claim 1, wherein the first and second frameworks include interconnected longitudinal frame members, transverse frame members, and vertical frame members.

4. The modular process plant structural system of claim 1, wherein the first and the second frameworks are selected from materials of carbon steel, and galvanized carbon steel.

5. The modular process plant structural system of claim 1, wherein the first and second modules are connected by means of twist lock corner connectors.

6. The modular process plant structural system of claim 1, wherein the first and second modules are connected by means of bridge clamp connectors.

7. The modular process plant structural system of claim 1 wherein the production plant is a chemical production plant.

8. The modular process plant structural system of claim 1 wherein the production plant is a gas-to-liquids (GTL) production plant.

9. The modular process plant structural system of claim 1 wherein the production plant is a gasoline production plant.

10. The modular process plant structural system of claim 1 wherein the production plant is a DME production plant.

11. The modular process plant structural system of claim 1 having module frames at least 20 feet long, 8 feet wide, and between 8-9.5 feet tall.

12. The modular process plant structural system of claim 1 having module frames at least 40 to 45 feet long, 8 feet wide, and between 8-9.5 feet tall.

13. The modular process plant structural system of claim 1 wherein the first and second modules are each capable of holding at least one chemical component piece of equipment.

14. The modular process plant structural system of claim 1 wherein the first and second modules units are each capable of holding at least one non-chemical component piece of equipment.

15. The modular process plant structural system of claim 1 wherein the first and second modules have ISO 1161 corner fittings.

* * * * *